(12) United States Patent
Blank

(10) Patent No.: US 6,519,854 B2
(45) Date of Patent: Feb. 18, 2003

(54) SIDE IMPACT REINFORCEMENT

(75) Inventor: Norman E. Blank, Wayne, NJ (US)

(73) Assignee: Sika Corporation, Lyndhurst, NJ (US)

( * ) Notice: Subject to any disclaimer, the term of this patent is extended or adjusted under 35 U.S.C. 154(b) by 0 days.

(21) Appl. No.: 09/800,340

(22) Filed: Mar. 6, 2001

(65) Prior Publication Data

US 2002/0033617 A1 Mar. 21, 2002

Related U.S. Application Data

(62) Division of application No. 09/663,566, filed on Sep. 15, 2000.

(51) Int. Cl.$^7$ .................................................. B23P 6/00

(52) U.S. Cl. .................. 29/897.1; 29/897.2; 29/402.09; 29/446

(58) Field of Search .............................. 29/897.2, 897.3, 29/446, 447, 527.1, 530, 897.1, 892.35, 402.09, 402.18, 890.031, 727; 296/187, 188, 203.01, 203.03, 146.6; 52/735.1, 731.6, 309.15, 309.8; 264/46.4, 46.6, 46.7; 403/56, 122

(56) References Cited

U.S. PATENT DOCUMENTS

| | | | |
|---|---|---|---|
| 1,993,307 A | * | 3/1935 | Nicholson |
| 3,434,258 A | | 3/1969 | Leurent |
| 3,493,257 A | | 2/1970 | Fitzgerald et al. |
| 4,019,301 A | | 4/1977 | Fox |
| 4,610,836 A | | 9/1986 | Wycech |
| 4,695,343 A | | 9/1987 | Wycech |
| 4,732,806 A | | 3/1988 | Wycech |
| 4,737,407 A | | 4/1988 | Wycech |
| 4,751,249 A | | 6/1988 | Wycech |

(List continued on next page.)

FOREIGN PATENT DOCUMENTS

| | | |
|---|---|---|
| CA | 2114888 | 2/1994 |
| FR | 2749263 | 5/1996 |
| GB | 2067478 | 7/1981 |
| JP | 61205109 | 3/1986 |
| JP | 61295028 | 12/1986 |
| JP | 1113186 | 1/1999 |

OTHER PUBLICATIONS

Side view photograph of admitted prior art automobile rail reinforcing member with adhesively attached thermally expandable reinforcing material after bake–out but not shown positioned within the rail.

Perspective review of admitted prior art automobile rail reinforcing member with adhesively attached theremally expandable reinforcing material after bake–out but not shown positioned within the rail.

Photograph of section of admitted prior art SUV crossmember reinforcing member with adhesively attached thermally expandable material after bake–out located between metal structural parts of an automobile.

Primary Examiner—Greg Vidovitch
Assistant Examiner—T. Nguyen

(57) ABSTRACT

An expansible reinforcer for reinforcing a hollow structural member of an automobile, aircraft, boat, etc. is provided. The reinforcer is flexible/bendable and comprises a synthetic, resin-based expansible reinforcing material secured thereto. In a preferred embodiment, the reinforcer comprises a plurality of supports pivotally connected to one another in a train-like arrangement. The reinforcing material is formed of a thermally expansible composition which preferably has an expansion temperature similar to the temperatures achieved in specific stages of a particular manufacturing process (e.g., such as the temperature at which the paint bake or powder bake stage is carried out in the automobile manufacturing process). The inventive reinforcer is capable of being fed into the opening of a tight cavity on a structural member so as to provide uniform reinforcement of the structural member.

9 Claims, 3 Drawing Sheets

U.S. PATENT DOCUMENTS

| | | |
|---|---|---|
| 4,769,391 A | 9/1988 | Wycech |
| 4,836,516 A | 6/1989 | Wycech |
| 4,853,270 A | 8/1989 | Wycech |
| 4,861,097 A | 8/1989 | Wycech |
| 4,862,660 A | 9/1989 | Raymond |
| 4,901,500 A | 2/1990 | Wycech |
| 4,908,930 A | 3/1990 | Wycech |
| 4,922,596 A | 5/1990 | Wycech |
| 4,923,902 A | 5/1990 | Wycech |
| 4,936,004 A | 6/1990 | Vaughn |
| 4,964,514 A | 10/1990 | Wycech |
| 4,978,562 A | 12/1990 | Wycech |
| 4,995,545 A | 2/1991 | Wycech |
| 5,124,186 A | 6/1992 | Wycech |
| 5,194,199 A | 3/1993 | Thum |
| 5,213,391 A | 5/1993 | Takagi |
| 5,344,208 A | 9/1994 | Bien et al. |
| 5,575,526 A | 11/1996 | Wycech |
| 5,635,562 A | 6/1997 | Malcolm |
| 5,660,901 A | 8/1997 | Wong |
| 5,755,486 A | 5/1998 | Wycech |
| 5,766,719 A | 6/1998 | Rimkus |
| 5,884,960 A | 3/1999 | Wycech |
| 5,888,600 A | 3/1999 | Wycech |
| 5,992,923 A | 11/1999 | Wycech |
| 6,003,274 A | 12/1999 | Wycech |
| 6,058,673 A | 5/2000 | Wycech |
| 6,250,711 B1 * | 6/2001 | Takahara ................ 296/146.6 |

*Primary Examiner—*

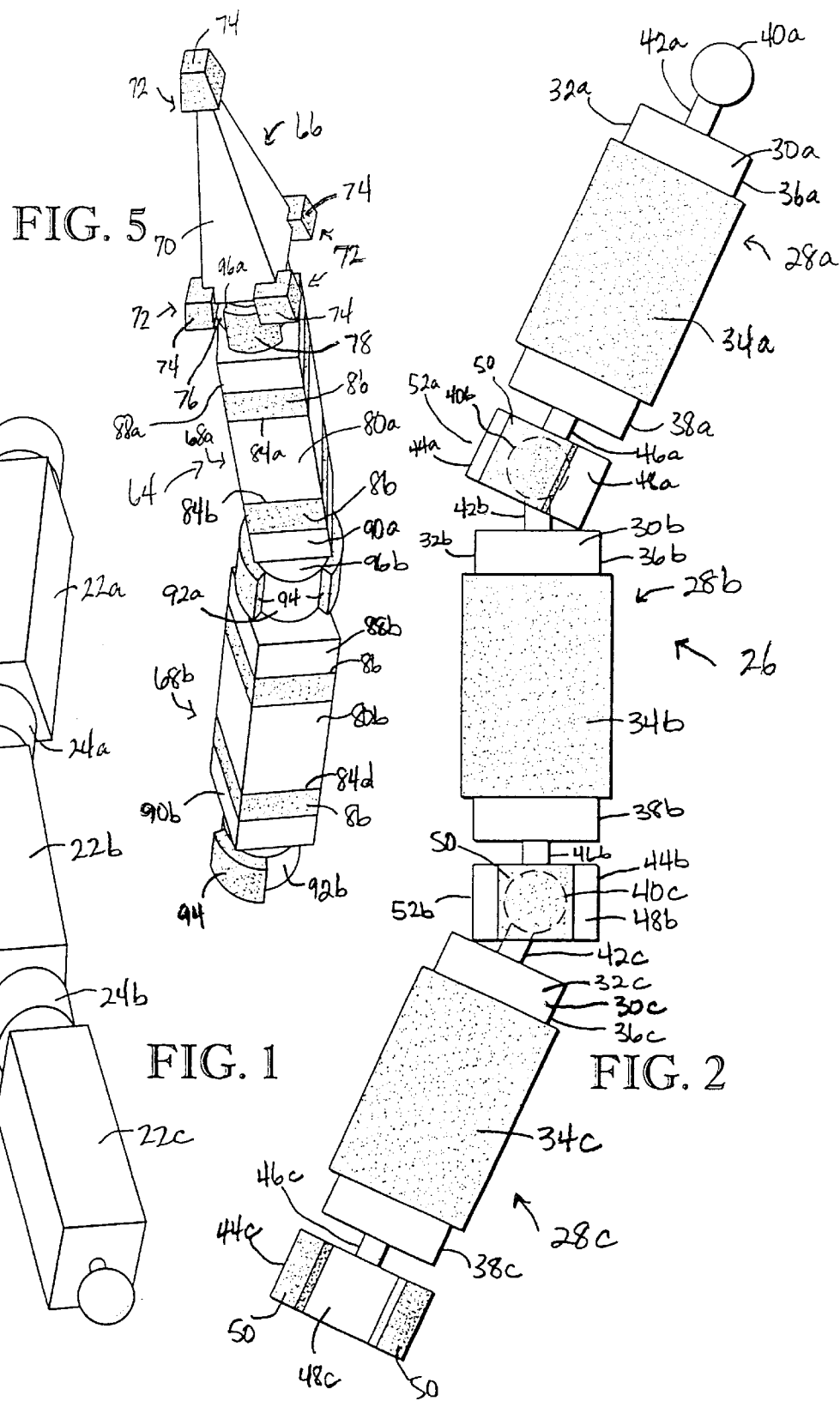

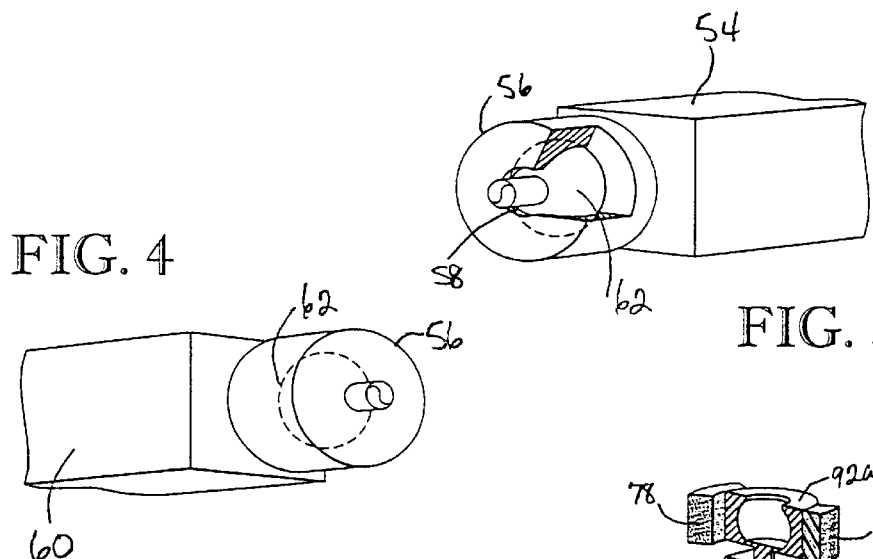
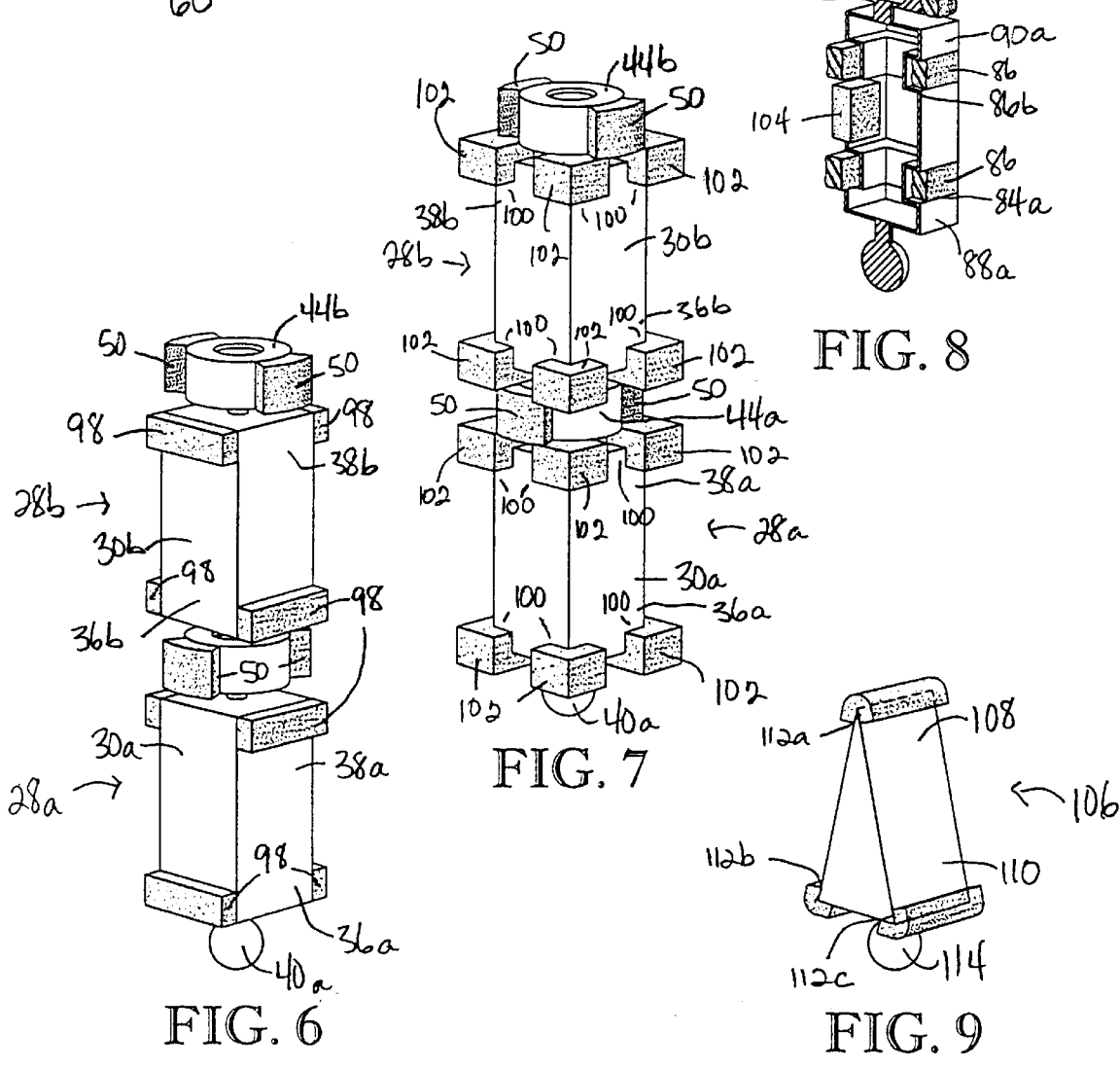

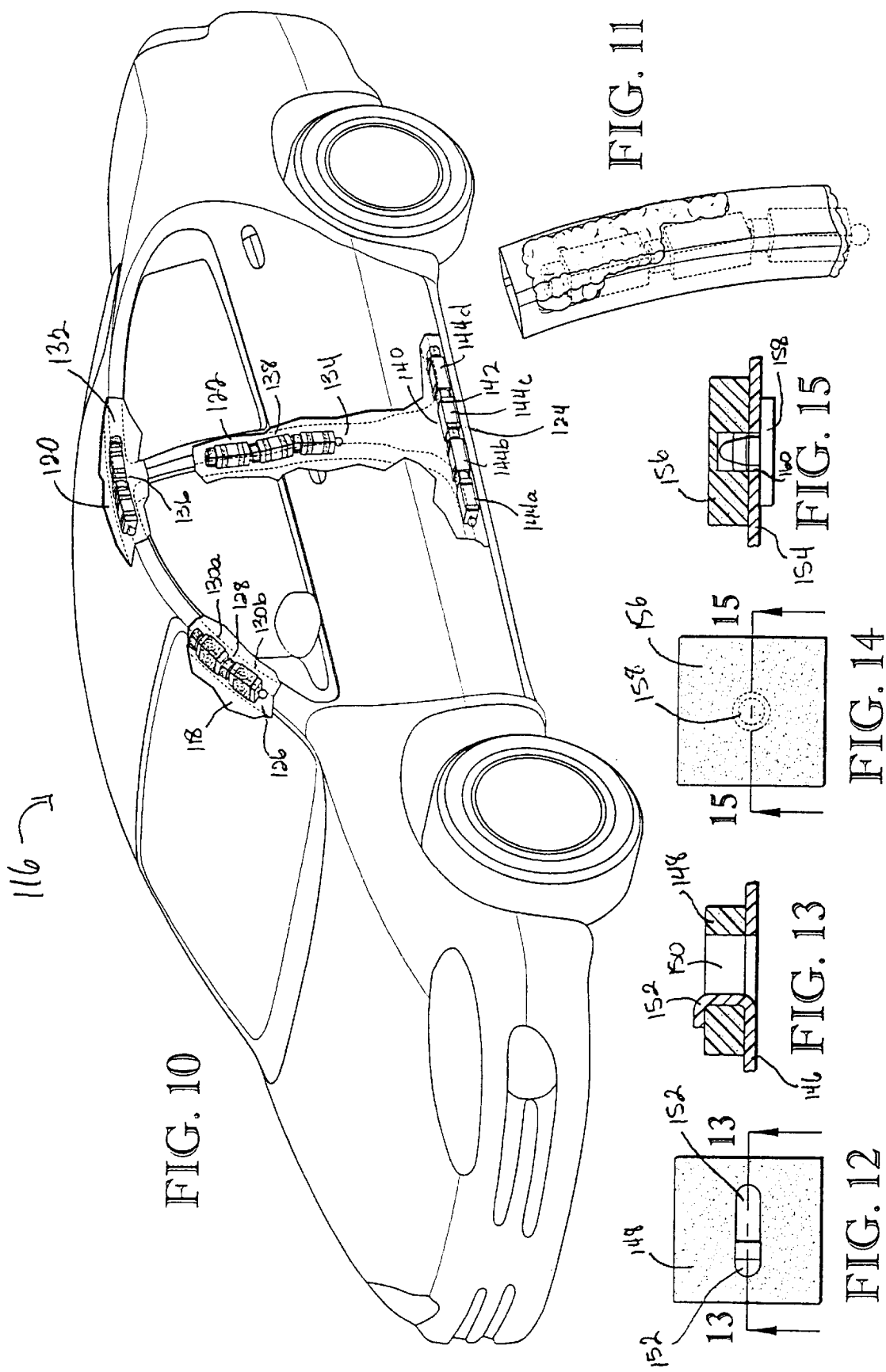

SIDE IMPACT REINFORCEMENT

This application is a divisional of U.S. patent application Ser. No. 09/663,566, filed Sep. 15, 2000, incorporated by reference herein.

BACKGROUND OF THE INVENTION

1. Field of the Invention

The present invention is broadly directed towards a reinforcer and method of using the reinforcer to reinforce hollow structural members such as those commonly found in vehicles. More particularly, the reinforcer comprises a support having an expansible, synthetic resin reinforcing material attached thereto, wherein the reinforcer is sufficiently flexible or bendable to allow it to negotiate nonlinear or irregular shaped cavities.

2. Description of the Prior Art

During the design and development of automobiles, trucks, aircraft, watercraft, etc., much of the body structure includes hollow cavities, rails, or frame sections. Many times, the structural integrity of the body is improved through increasing the stiffness in localized critical areas. Increased stiffness in these areas generally results in reduced vibration, noise, and/or fatigue propagation. Additional stiffness in these areas has also provided energy management during crash or impact situations.

Many attempts have been made to reinforce these cavities. One such method involves introducing self-sustaining, reinforcing products into the cavity, either with or without a support or carrier structure. However, these methods generally result in the addition of excess weight to the structural member which is undesirable in most instances.

Attempts have also been made to utilize reinforcing products which are lighter in weight or which do not use a support structure, but these attempts usually involve products which lack the necessary strength for properly reinforcing the structural member. Many times the foamable portions of these products do not sufficiently expand upon heating due to the fact that the center of the material is not being properly heated during the activation process. That is, the size of the foam product is sufficiently thick that the core of the product is exposed to minimal heat, thus preventing the core from fully expanding. This can lead to an inadequately reinforced structural member.

Furthermore, many of the structural members that need reinforcement have cavities that are irregular in shape or narrow in size, thus making them difficult, if not impossible, to sufficiently position currently available reinforcing apparatuses therein. For example, the windshield and side pillars on an automobile are typically curved and quite narrow. As a result, currently available reinforcing products generally cannot be passed into the curved, narrow member in the manner necessary to achieve evenly distributed reinforcement along the length of the member. Thus, in order to properly reinforce these pillars, manufacturers must provide parts especially fabricated for a particular pillar. This requires a high degree of manufacturing tolerance and does not allow a single part to be used for a wide variety of hollow structural members.

There is a need for a lightweight, high-strength reinforcing product which is sufficiently versatile to be readily inserted into a wide array of small or irregularly-shaped channels.

SUMMARY OF THE INVENTION

The instant invention overcomes these problems by providing a thermally expansible reinforcer for reinforcing a hollow structural member (such as an automobile rail) having a small and/or irregularly shaped cavity.

In more detail, the reinforcing member includes a plurality of pivotally connected sections (such as ball-and-socket connections) with each section comprising a support and a thermally expansible material attached thereto. The support is preferably formed of nylon or metal and each support can be shaped as a tubular, box-like structure which can be used in wide array of cavities. Alternately, one or more of the supports can have a special shape (e.g., pyramidal) to allow the reinforcer to readily enter particularly tight areas.

The reinforcing material is preferably a synthetic, resin-based material which expands when subjected to temperatures achieved at specific points in a manufacturing process (e.g., such as during the paint or powder bake stages of automobile manufacturing processes). This expansion is achieved either by internally created thermal energy or by the external application of heat to activate the material. As used herein, the term "thermally expansible" means both internally created thermal energy and the external application of heat to expand and foam the reinforcing material. The expansion temperature of the material should be at least about 300° F.

The inventive reinforcers are particularly useful in that their pivotal connections allow them to be easily fed lengthwise into the opening of a structural member. Furthermore, by utilizing a reinforcer having a number of interconnected sections, reinforcement of the structural member is uniformly distributed over the length of the member.

BRIEF DESCRIPTION OF THE DRAWINGS

FIG. 1 is a perspective view of a reinforcer according to the invention;

FIG. 2 is a top view of a reinforcer of the invention having sleeves of expansible material around box-like supports;

FIG. 3 is a partial cutaway view depicting a ball-and-socket connection;

FIG. 4 is a partial cutaway view depicting a ball-and-socket connection;

FIG. 5 is a perspective view of an alternate embodiment of the invention wherein one of the reinforcer supports is pyramidal in shape;

FIG. 6 is a perspective view of an alternate embodiment of the invention depicting the use of strips of expansible material on the reinforcer supports;

FIG. 7 is a perspective view of an alternate embodiment of the invention depicting the use of blocks of expansible material on the corners of the reinforcer supports;

FIG. 8 is a cross-sectional view of a support similar to those of FIG. 5, depicting the use of a baffle material within the support;

FIG. 9 is a perspective view of an alternate shape for the reinforcer supports;

FIG. 10 is a perspective view of an automobile having structural members reinforced with the inventive reinforcers prior to thermal expansion;

FIG. 11 depicts a structural member reinforced according to the invention after thermal expansion has taken place;

FIG. 12 depicts the use of a bend tab for securing an expansible material to a support of the inventive reinforcer;

FIG. 13 is a cross-sectional view taken along line 13—13 of FIG. 12;

FIG. 14 depicts the use of a push pin for securing an expansible material to a support of the inventive reinforcer; and FIG. 15 is a cross-sectional view taken along line 15—15 of FIG. 14.

DETAILED DESCRIPTION OF THE PREFERRED EMBODIMENTS

Turning now to the figures, FIG. 1 illustrates a reinforcer 20 comprising three rigid, box-like supports 22a–c connected in a train-like arrangement via pivotal connections 24a,b.

Referring to FIG. 2, a reinforcer 26 is shown in more detail. Reinforcer 26 comprises a chain of sections 28a–c which each include respective supports 30a–c. Each of supports 30a–c comprises a tubular, box-like configuration and includes respective outer surfaces 32a–c. A quantity of an expansible synthetic resin material is attached to each outer surface 32a–c so as to surround each support 30a–c and form a sleeve 34a–c therearound. The sleeves 34a–c are maintained on the supports 30a–c by way of a friction-fit.

Each support is similar in construction. That is, each of supports 30a–c comprises respective first ends 36a–c, and second ends 38a–c remote from first ends 36a–c. A ball 40a–c is attached, via a shaft 42a–c, to each support 30a–c adjacent the first end 36a–c thereof Furthermore, a socket 44a–c is attached, via a shaft 46a–c, to each of support 30a–c adjacent the second end 38a–c thereof. Finally, each of sockets 44a–c comprises an outer surface 48a–c having one or more blocks 50 of expansible synthetic resin material attached thereto.

It will be appreciated that the use of ball 40a–c and socket 44a–c allows for a pivotal ball-and-socket connection 52a,b to be formed between each pair of sections 28a–c. This connection is best seen in FIGS. 3 and 4 where a support 54 comprising a socket 56 having an opening 58 formed therein. A support 60 comprises a ball 62 disposed in the opening 58 to allow free movement between supports 54 and 60 while maintaining a connection between these supports.

Although FIGS. 1–4 depict the inventive reinforcers as box-like supports having sleeves of expansible synthetic resin material attached thereto, it will be appreciated that a number of configurations can be used, depending upon the structural member to be reinforced. For example, FIG. 5 depicts a reinforcer 64 comprising a first section 66 and second and third sections 68a,b. First section 66 comprises a pyramidal-shaped support 70 having five corner sections 72 (with only four sections 72 being visible in FIG. 5), with a block 74 of expansible synthetic resin material attached to each corner section 72. Finally, first section 66 comprises a socket 76 having a block 78 of expansible synthetic resin material attached thereto. Advantageously, the use of a pyramidal-shaped support 70 allows the reinforcer 64 to fit in small, hard-to-access corners or crevices of a structural member.

Second and third sections 68a,b to one another are similar to one another in construction and include respective supports 80a,b. Each of supports 80a,b comprises a tubular, box-like configuration and includes respective outer surfaces 82a,b having recessed areas 84a–d formed therein. Each of recessed areas 84a–d has a band 86 of expansible synthetic resin material deposited therein. Placing the bands 86 within the recessed areas 84a–d serves to "lock" the bands 86 in place, thus preventing movement thereof along the length of the supports 80a,b.

Each of supports 80a,b comprises respective first ends 88a,b, and second ends 90a,b remote from first ends 88a,b. A ball (not shown) is attached to each support 80a,b adjacent the first end 88a,b thereof, while a socket 92a,b is attached to each of supports 80a,b adjacent the second end 90a,b thereof. Furthermore, each of sockets 92a,b comprises one or more blocks 94 of expansible synthetic resin material attached thereto. Finally, each of sections 66 and 68a,b are connected in a train-like arrangement via ball-and-socket pivotal connections 96a,b similar to those described with respect to FIG. 2.

FIGS. 6 and 7 show alternate arrangements of the expansible synthetic resin material on the supports of the inventive reinforcers. The supports illustrated in FIGS. 6 and 7 are similar to those depicted in FIG. 2, with like numbering representing like parts. In FIG. 6, a plurality of strips 98 formed of the expansible synthetic resin material are attached (e.g., such as by an adhesive) adjacent first ends 36a,b and second ends 38a,b, on opposing sides of the supports 30a,b.

The supports 28a,b of FIG. 7 each include eight corner sections 100 (with only six corner sections 100 of each support 28a,b being visible in FIG. 7). Blocks 102 of expansible synthetic resin material are secured to respective corners 100. It will be appreciated that the wide array of configurations possible for attaching expansible synthetic resin materials to the supports of the inventive reinforcers allows the user to adapt the reinforcer for a large number of structural members having channels or cavities of various shapes and sizes.

FIG. 8 is a cross-sectional view of a section of a reinforcer according to the invention similar to second or third sections 68a,b of FIG. 5, with like numbering representing like parts. In this embodiment, a further block 104 of an expansible synthetic resin material is provided. The block 104 can be formed of a reinforcing material if further structural reinforcement is desired, or block 104 can be formed of a baffle material to assist in lessening noises which typically pass through hollow structural members. A particularly preferred baffle material is disclosed in U.S. patent application Ser. No. 09/407,820, incorporated by reference herein.

FIG. 9 depicts yet another support shape which is useful for fitting into small and/or irregular shaped cavities. In this embodiment, the support 106 is wedge-shaped and comprises an upper end 108 and a lower end 110 as well as edges 112a–c. Support 106 includes a ball 114 adjacent lower end 110. Thus, the support 106 can be pivotally connected via ball 114 to a socket of another support as discussed with previous embodiments.

Each of the above-described supports, balls, sockets, and shafts should be formed of a material having a melting point higher than the expansion or foaming temperature of the expansible material. Furthermore, the melting point of these items should be higher than any intermediate processing temperatures to which the intended structural member will be subjected. Preferred such materials include metal and nylon.

The expansible synthetic resin reinforcing material used in the present invention is preferably a dry, initially non-tacky material that develops adhesion upon expansion so that it adheres to the surrounding structural members when activated. Activation may be by heating, such as that which occurs in automobile assembly plants. When subjected to a temperature of at least about 300° F., the thermally expansible foaming material should have a percent expansion of at least about 40%, preferably at least about 125%, and more preferably from about 150–300%, to provide sufficient structural reinforcement and compressive strength. As used herein, the percent expansion is defined as:

100×{[(the specific gravity of the material before heating)−(the specific gravity of the material after heating)]/(the specific gravity of the material after heating)}.

One preferred composition for use as the reinforcing material is commercialized under the name SikaReinforcer (Sika Corporation, Madison Heights, Mich.). In more detail, the most preferred composition comprises: from about 20–30% by weight of a styrene-butadiene-styrene (SBS) block co-polymer (e.g., Fina Clear 530®); from about 5–20% by weight of a polystyrene (e.g., Fina Crystal 500® and Fina Crystal 535®); from about 30–45% by weight of a bisphenol A-based liquid epoxy resin (e.g. Araldite 6010® and Epon 71®); from about 0.5–5% by weight of a pigment such as carbon black; up to about 5% by weight butadiene acrylonitrile rubber (e.g., Nipol 1411); from about 1–10% by weight hydrated amorphous silica (e.g., HiSil 233); from about 10–20% by weight glass microspheres (e.g., Scotchlite S60); from about 0.1–5% by weight of a blowing agent such as azodicarbonamide (e.g., Celogen AZ 765®, Celogen AZ 754A®, and Celogen AZ 130®); from about 0.1–5% by weight of a catalyst such as N,N,-dimethyl phenyl urea (e.g., U405); from about 0.1–5% by weight of a curing agent such as dicyandiamide (e.g., DDA10); and up to about 5% by weight of a "kicker" such as zinc oxide to lower the blowing temperature, with all percents by weight being based upon the total weight of the composition taken as 100% by weight.

A particularly preferred composition for use as the reinforcing material comprises about 12.94% by weight polystyrene, about 23.22% by weight SBS block copolymer, about 0.57% by weight carbon black, about 1.90% by weight butadiene acrylonitrile rubber, about 4.28% by weight hydrated amorphous silica, about 38.07% by weight bisphenol A-based liquid epoxy resin, about 14.75% by weight glass microspheres, about 0.46% by weight zinc oxide, about 2.85% by weight dicyandiamide, about 0.38% by weight N,N dimethyl phenyl urea, and about 0.57% by weight azodicarbonamide. In certain applications where increased compressive strength and reduced foaming and expansion are desired, the foregoing may be adjusted so that the polystyrene is reduced to about 12.63% by weight, the SBS block copolymer is reduced to about 22.59% by weight, and the butadiene acrylonitrile rubber is increased to about 2.85% by weight.

The composition are preferably formed by mixing the SBS block co-polymer with a small portion (about ⅟₄₀th of the total amount) of the bisphenol A-based liquid epoxy resin in a heated mixer until the temperature of the mixer reaches from about 240–260° F. (the temperature of the mixture within the mixer is at least about 175° F.), and the mixture is substantially homogeneous, at which time the polystyrene is added to the mixer and mixing is continued. After the polystyrene is substantially mixed with the SBS block co-polymer/epoxy resin mixture, the remainder of the bisphenol A-based epoxy resin is slowly added to the mixer, stopping and starting the mixer as necessary, with the ingredients being thoroughly mixed to obtain a substantially homogeneous mixture. The desired amount of this mixture is placed in a heated mixer (set at a temperature of about 250° F.) and mixing is commenced. While mixing, the carbon black and rubber are added to the mixer and mixing is stopped once a homogeneous mixture is obtained within the mixer. Either the silica or glass microspheres is added to the mixer, and mixing is resumed and continued until the mixture is homogeneous. This step is repeated, adding the other of the silica or glass microspheres.

The temperature of the mixer is then set to a temperature below 160° F., the blowing agent(s), catalyst(s), kicker, and curing agent(s) are added, and mixing is resumed and continued only until the mixture is homogeneous. The resulting mixture is then preferably extruded into strands (at an extruder temperature of 170–180° F. and screw rotation speeds of about 400 rpm) and cut into pellets. The resulting pellets are injection molded at a temperature of about 180–200° F. using injection molding equipment designed to form the desired shape of the reinforcing material to be attached to the supports.

In application, the reinforcer is preferably provided to a manufacturer preassembled (i.e., with the non-expanded synthetic resin material attached to the particular supports) for insertion lengthwise into the cavity of the desired structural member, such as during the construction of an automobile. That is, the number, shape, and size of the supports are selected according to the particular pillar or other structural member in which the reinforcer will be used. However, unlike prior art reinforcing products, the inventive reinforcer is adaptable to many different structural members of many different vehicles due to the pivotal interconnections between the individual supports.

Referring to FIG. 10, a car 116 is depicted as having a windshield pillar 118, an upper rail 120, a B pillar 122, and a bottom rail 124, each of which is generally hollow and requires structural reinforcement, particularly for the safety of the car occupants during a side-impact collision. Windshield pillar 118 comprises a cavity 126 having a reinforcer 128 disposed therein. This particular reinforcer 128 comprises two pivotally linked sections 130a,b having sleeves of an expansible synthetic resin material similar to the embodiment shown in FIG. 2. Upper rail 120 and B pillar 122 comprise respective cavities 132,134 having respective reinforcers 136,138 disposed therein. Each of reinforcers 136, 138 comprise bands of expansible synthetic resin material similar to the arrangement described with respect to the embodiment of FIG. 5.

Finally, bottom rail 124 comprises a cavity 140 having a 4-section reinforcer 142 disposed therein. The sections 144a–d include opposing strips of an expansible synthetic resin reinforcing material attached thereto similar to the arrangement shown in FIG. 6.

It will be appreciated that each of cavities 126, 132, 134, 140 (and particularly cavities 126, 132, 134) are narrow and quite difficult to reinforce successfully. That is, it has typically been required to place metal bars fabricated specifically for that particular structural member of that particular vehicle. This requires a high degree of manufacturing tolerance and adds undesirable additional weight to the vehicle. Alternately, if prior art foamable reinforcing products are utilized, it has been necessary to add individual units at multiple locations within the pillar. This is quite time-consuming and does not generally provide uniform and reliable reinforcement of the structural member. However, as shown in FIG. 10, the inventive reinforcer can simply be fed lengthwise into a narrow, irregularly shaped cavity and temporarily secured at a single location near the cavity opening. Due to the pivotal connections between the various sections of the inventive reinforcer, the sections are able to twist and turn as necessary to navigate the structural member cavity.

After the reinforcer is placed in the cavity of the structural member, the vehicle can be subjected to a number of process or manufacturing steps which are typically carried out on the vehicle body without affecting the ability of the synthetic resin reinforcing material to expand when exposed to the actual activating temperature. When this temperature is reached (e.g., such as during the paint bake stage), the synthetic resin material begins to expand in all directions towards the walls forming the cavity (see FIG. 11) so as to substantially fill the cavity. Furthermore, the material on the outer surface of the sockets also expands around the pivotal connection, thus essentially or substantially immobilizing the connections to form high-strength, rigid, reinforcement within the structural member.

The expanded synthetic resin material preferably has a compressive strength (using a sample having a diameter of 2 inches and a length of 4 inches and a compression rate of 0.5 inches/minute) of at least about 1200 psi, preferably at least about 1400 psi, and more preferably at least about 1600 psi. Prior to expansion, the material has a specific gravity (with reference to water) of at least about 0.90, while the specific gravity (with reference to water) of the expanded material 60 is less than about 0.47, preferably less than about 0.37, and more preferably less than about 0.32. The expanded material has a ratio of compressive strength:specific gravity after bake of at least about 2500:1, preferably at least about 3000:1, and more preferably at least about 3600:1.

Although the present invention has been described with reference to the preferred embodiments illustrated in the accompanying figures, it is noted that substitutions may be made and equivalents employed without departing from the scope of the invention. For example, although the preferred embodiment is illustrated in connection with a structural member of a motor vehicle, the inventive reinforcing members may be employed in other structural members as well (e.g., in a boat, in an airplane, etc.). Furthermore, while SikaReinforcer is cited as one preferred composition of which the expansible synthetic resin material can be formed, any material meeting the above-described strength and expansion properties is suitable.

Also, while adhesive strips, friction-fits, and recessed areas are used to retain the expansible material on the supports in the above embodiments, other fasteners can be used as well. For example, FIGS. 12 and 13 depict a support wall 146 having a block 148 of expansible synthetic resin material supported thereon. Specifically, the block 148 has an opening 150 through which a bend tab 152 passes so as to retain block 148 in place until thermal expansion thereof FIGS. 14 and 15 illustrate yet another fastener wherein a support wall 154 has a block 156 of an expansible synthetic resin material attached thereto. In this embodiment, a push pin 158 is passed through an opening 160 on the wall 154 and into the block 156 so as to hold it in place.

While the reinforcers according to the invention have been described as a plurality of pivotally connected sections, it will be appreciated that this includes a single piece that is capable of being fed into and through small and/or irregular cavities. Finally, while the illustrated embodiments depict the inventive reinforcer as a plurality of supports in a train-like configuration (i.e., unbranched), it is also possible to arrange the supports in a branched manner if desired.

I claim:

1. A method of reinforcing a structural member presenting an elongated, nonlinear passageway communicating with an access opening, said method comprising the step of inserting an elongated, flexible reinforcer lengthwise through the access opening so that the reinforcer travels along said passageway, said reinforcer comprising at least two supports and respective pieces of an expansible synthetic resin material coupled to each of said supports, said supports being pivotally connected to one another.

2. The method of claim 1, wherein said passageway comprises a first end adjacent said access opening, a second end remote from said access opening, and a point about halfway between said first and second ends, said reinforcer traveling to at least about said halfway point.

3. The method of claim 1, wherein said structural member is a rail of a motor vehicle.

4. The method of claim 1, wherein said structural member is a frame of a motor vehicle.

5. The method of claim 1, further including the step of heating said reinforcer so as to cause said synthetic resin material pieces to expand, said reinforcer being substantially inflexible after said expansion.

6. The method of claim 1, wherein said structural member is a rail of a motor vehicle.

7. The method of claim 1, wherein said structural member is a frame of a motor vehicle.

8. The method of claim 1, further including the step of heating said reinforcer so as to cause said synthetic resin material to expand, said sections being essentially immobilized after said expansion.

9. A method of reinforcing a structural member defining a cavity, said method comprising the step of positioning a reinforcer in said cavity, said reinforcer comprising sections having respective axes and comprising respective pieces of an expansible synthetic resin material coupled to of each said sections, said reinforcer being configured so that at least two of said sections are shiftable between a parallel axes position and a nonparallel axes position as necessary during said positioning step, said sections being pivotally connected to one another.

* * * * *